(12) United States Patent
Ohtsuka et al.

(10) Patent No.: US 9,136,674 B2
(45) Date of Patent: Sep. 15, 2015

(54) DEAD TANK VACUUM CIRCUIT BREAKER

(75) Inventors: Kyoichi Ohtsuka, Chiyoda-ku (JP); Masahiro Arioka, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 289 days.

(21) Appl. No.: 13/394,063

(22) PCT Filed: Oct. 29, 2009

(86) PCT No.: PCT/JP2009/005741
§ 371 (c)(1),
(2), (4) Date: Mar. 2, 2012

(87) PCT Pub. No.: WO2011/052010
PCT Pub. Date: May 5, 2011

(65) Prior Publication Data
US 2012/0160810 A1 Jun. 28, 2012

(51) Int. Cl.
*H02B 13/02* (2006.01)
*H02B 13/035* (2006.01)
(Continued)

(52) U.S. Cl.
CPC .... *H02B 13/0354* (2013.01); *H01H 2033/6665* (2013.01); *H02B 3/00* (2013.01)

(58) Field of Classification Search
CPC ..... H01H 33/66; H01H 33/666; H01H 33/56; H01H 33/02
USPC ................. 218/2, 3, 7, 10, 14, 140, 153, 154; 439/816
See application file for complete search history.

(56) References Cited

U.S. PATENT DOCUMENTS 6,435,922 B2 * 8/2002 Keiser et al. ................... 439/816
6,547,607 B2 * 4/2003 Moll et al. ..................... 439/816
(Continued)

FOREIGN PATENT DOCUMENTS

CN 101395686 A 3/2009
DE 29700930 U1 4/1997
(Continued)

OTHER PUBLICATIONS

Office Action issued on Jan. 6, 2014, by the Chinese Patent Office in corresponding Chinese Patent Application No. 200980162302.6, and an English Translation of the Office Action. (12 pages).
(Continued)

*Primary Examiner* — Amy Cohen Johnson
*Assistant Examiner* — Marina Fishman
(74) *Attorney, Agent, or Firm* — Buchanan Ingersoll & Rooney PC

(57) ABSTRACT

A dead tank vacuum circuit breaker of the invention has an object to obtain a dead tank vacuum circuit breaker in which an immovable end of a vacuum valve is supported on a tank immovable side via an insulating support member and a support frame or the immovable end of the vacuum valve is supported on a tank movable side via an insulating support rod, so that an insulating support member supporting a movable end of the vacuum valve is omitted, while an opening portion is provided to the movable side of the tank and a bushing center conductor has a slidable connection portion that is axially expandable and contractible, so that a de-assembly range can be minimized when the vacuum valve is replaced.

12 Claims, 6 Drawing Sheets

(51) Int. Cl.
*H01H 33/666* (2006.01)
*H02B 3/00* (2006.01)

(56) References Cited

U.S. PATENT DOCUMENTS

| | | | | |
|---|---|---|---|---|
| 6,693,250 | B2* | 2/2004 | Matsushita et al. | 218/3 |
| 8,110,770 | B2* | 2/2012 | Ichikawa et al. | 218/134 |
| 2010/0288733 | A1 | 11/2010 | Ichikawa et al. | |

FOREIGN PATENT DOCUMENTS

| | | |
|---|---|---|
| JP | 56-170846 U | 12/1981 |
| JP | 57-017528 A | 1/1982 |
| JP | 2-158029 A | 6/1990 |
| JP | 2001-037026 A | 2/2001 |
| JP | 2004-235122 A | 8/2004 |
| JP | 2005-086925 A | 3/2005 |
| JP | 2007-306701 A | 11/2007 |
| WO | WO 2007/132598 A1 | 11/2007 |

OTHER PUBLICATIONS

International Search Report (PCT/ISA/210) issued on Nov. 24, 2009, by Japanese Patent Office as the International Searching Authority for International Application No. PCT/JP2009/005741.

Office Action (Notification of Reasons for Refusal) dated Apr. 11, 2013, issued by the Korean Patent Office in corresponding Korean Patent Application No. 10-2012-7010709 and an English translation thereof. (10 pages).

Third Office Action issued on Jan. 6, 2015 by the Chinese Patent Office in corresponding Chinese Patent Application No. 200980162302.6 and English language translation (14 pages).

Patent Examination Report No. 1 issued on Jan. 16, 2015 by the Australian Patent Office in corresponding Australian Patent Application No. 2014201925 (3 pages).

Office Action issued on Mar. 18, 2015 by the German Patent Office in corresponding German Patent Application No. 11 2009 005 337.8 and English language translation (18 pages).

* cited by examiner

DEAD TANK VACUUM CIRCUIT BREAKER

TECHNICAL FIELD

The present invention relates to a dead tank vacuum circuit breaker used in power equipment.

BACKGROUND ART

A dead tank vacuum circuit breaker in the related art is configured in such a manner that a movable-side end of a vacuum valve is fixed at one end of a tank via a contact case and an insulating support tube and an immovable-side end of the vacuum valve is fixed at the other end of the tank via a contact case and a support insulator. A conductor of a bushing is connected to the contact case on each of the movable side and the immovable side. A movable conductor connected to a coupling mechanism of an drive unit attached to the tank on the outside at the movable-side end and an immovable conductor allowed to come close to and to move apart from the movable conductor are provided in an interior of the vacuum valve. The movable-side bushing conductor, the movable-side contact case, the movable conductor and the immovable conductor of the vacuum valve, the immovable-side contact case, and the immovable-side bushing conductor together define an energizing path (for example, see Patent Document 1).

PRIOR ART DOCUMENT

Patent Document

[Patent Document 1] JP-A-2007-306701 (FIG. 1)

SUMMARY OF THE INVENTION

Problems that the Invention is to Solve

With the dead tank vacuum circuit breaker in the related as described above, the vacuum valve is replaced generally in a manner as follows. That is, the bushing conductors are pulled out from the contact cases by separating the movable-side and immovable-side bushings from the tank. The immovable-side end of the tank is opened and the immovable-side support of the vacuum valve is removed. Then, an operation box, the drive unit, and the coupling mechanism attached to the movable side of the tank are removed, and the vacuum valve is pulled out from the movable side. As has been described, many parts have to be disassembled when the vacuum valve is replaced, and therefore workability is poor. Also, from the viewpoint that many parts are disassembled, there is a possibility that reliability of an apparatus is lowered after the vacuum valve is replaced and the apparatus is restored.

The invention is devised to solve the problem as above and provides a dead tank vacuum circuit breaker capable of enhancing workability of vacuum valve replacement owing to a structure that reduces disassembly points.

Means for Carrying Out the Invention

According to a dead tank vacuum circuit breaker of the invention, an immovable end of a vacuum valve is supported on a tank immovable side via an insulating support member and a support frame or the immovable end of the vacuum valve is supported on a tank movable side via an insulating support rod. Hence an insulating support member supporting a movable end of the vacuum valve is omitted. Also, it is characterized in that an opening portion is provided to the movable side of the tank and that a bushing center conductor has a slidable connection portion that is axially expandable and contractible.

As an alternative to the expandable and contractible, slidable connection portion of the bushing center conductor, an insertion portion of a contact case in which to insert the busing center conductor is of a structure attachable to and detachable from the contact case by means of bolt fastening.

Advantage of the Invention

According to the invention, when a vacuum valve is replaced, the vacuum valve can be pulled out and inserted from the tank immovable side without having to separate the bushing from the tank or without having to remove an drive unit or a coupling mechanism thereof attached to the tank on the outside on the movable side. It thus becomes possible to enhance workability of replacement in a vacuum breaker portion.

MODE FOR CARRYING OUT THE INVENTION

First Embodiment

Figure 1:
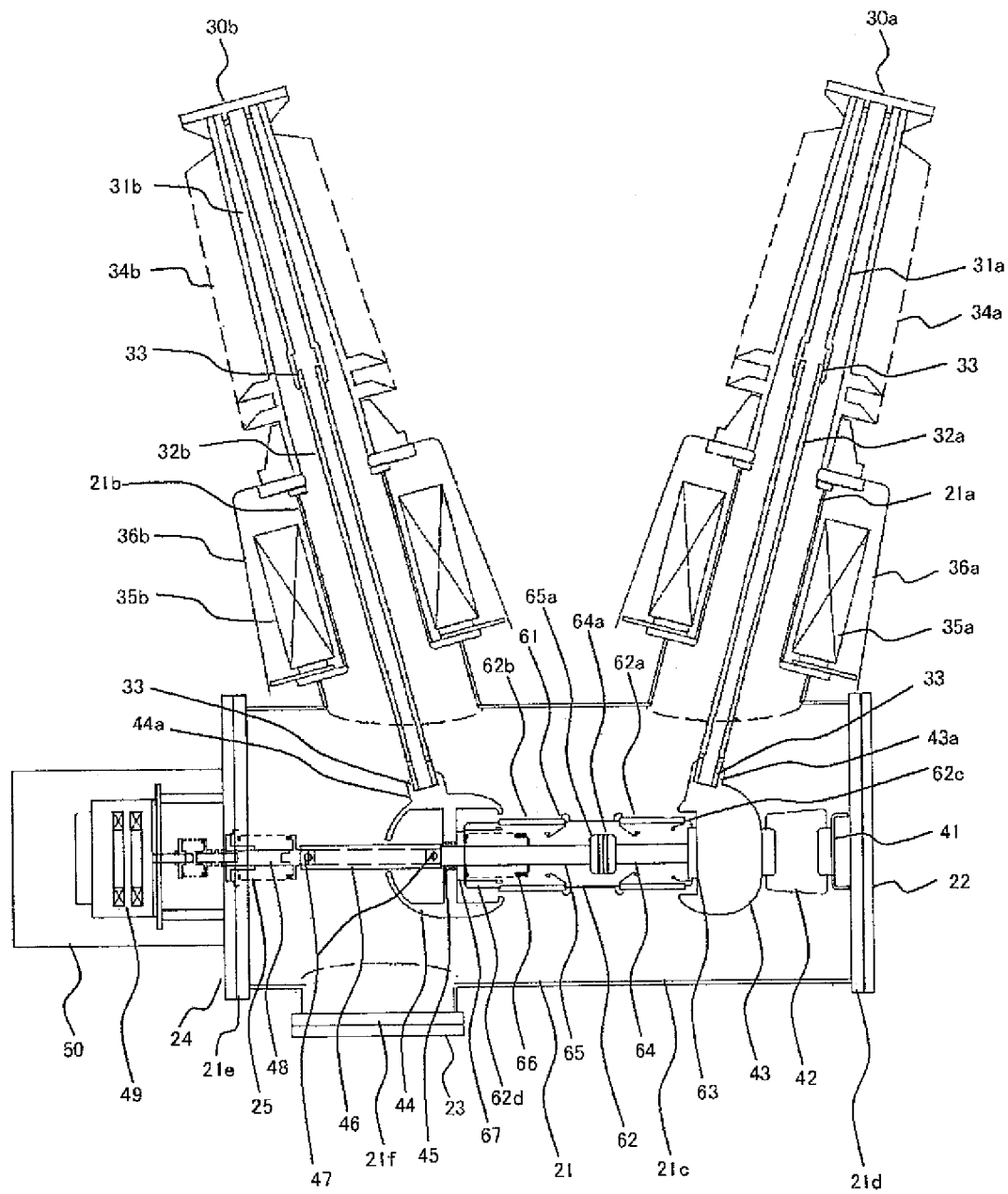
FIG. 1 is a cross section of a dead tank vacuum circuit breaker according to a first embodiment of the invention.
Figure 2:
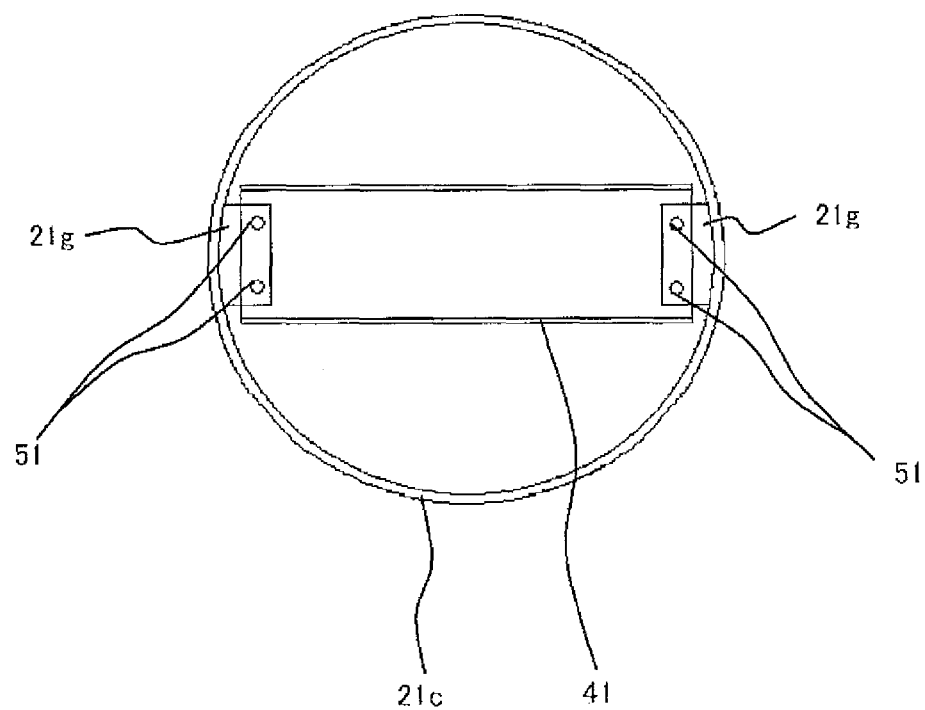
FIG. 2 is a plan view used to describe a support frame attachment structure according to the first embodiment of the invention.

FIG. 1 is a cross section of a dead tank vacuum circuit breaker in a best mode for carrying out the invention. FIG. 2 is a plan view showing an attachment structure of a tank and a support frame to which a vacuum valve shown in FIG. 1 is fixed. Hereinafter, one mode for carrying out the invention will be described according to the drawings.

Referring to FIG. 1, an electrically grounded tank 21 is installed with a barrel portion 21c set in a horizontal posture. A pair of opening portions 21a and 21b is provided in an upper part of the tank 21. Current transformers 35a and 35b and current transformer covers 36a and 36b are provided concentrically to the respective opening portions and bushings 34a and 34b are attached to end portions of the respective openings. Opening portions 21d and 21e are provided at the both ends of the tank 21. An opening portion 21f is provided to the tank 21 at a bottom on the movable side. In order to make a tank interior airtight, lid plates 22, 23, and 24 are attached to the respective opening portions. The tank interior requires airtightness because dry air or a gas with high electrical insulation at a pressure different from atmospheric pressure is used therein.

A vacuum valve 61 is installed in the tank 21 while being spaced apart from the barrel portion 21c. The vacuum valve 61 is formed of a tube-like vacuum container 62 including insulating tubes 62a and 62b made of ceramic or the like, an immovable conductor 64 housed in the vacuum container 62 with one end joined to an end plate 63 that hermetically seals an immovable-side end portion 62c of the vacuum container 62, and a movable conductor 65 with one end allowed to come close to and move apart from the immovable conductor 64 and the other end extending to an outside of the vacuum container 62 by penetrating through a bellows 66 attached to a movable-side end portion 62d of the vacuum container 62. An immovable contact point 64a and a movable contact point 65a are provided to the immovable conductor 64 and the movable conductor 65, respectively, in portions coming into contact with each other. Conductive metal, such as copper alloy and aluminum alloy, is used for the end plate 63, the immovable conductor 64, and the movable conductor 65. The vacuum container 62, the end plate 63, the bellows 66, and the movable conductor 65 together form an airtight container and the interior of the vacuum valve 61 is maintained under vacuum.

An drive unit (opening and closing means) 49 that opens the immovable contact point 64a and the movable contact point 65a to move apart from each other and closes the both to come close to each other is provided on the outside of the tank 21 and housed in an operation box 50. The drive unit 49 opens the immovable contact point 64a and the movable contact point 65a to move apart from each other and closes the both to come close to each other by horizontally moving the movable conductor 65 connected thereto via an operation rod 48 penetrating through a bellows 25 and an insulating rod 46. In this instance, the interior of the vacuum valve 61 is maintained under vacuum because the bellows 66 follows a movement of the movable conductor 65, and the interior of the tank 21 is maintained airtight because the bellows 25 follows a movement of the operation rod 48. The insulating rod 46 is connected to the movable conductor 65 and the operation rod 48 with pins 47 while securing an insulating distance sufficient to provide electrical insulation between the movable conductor 65 and the operation rod 48.

An immovable-side shield 43 and a movable-side shield 44 are provided to both ends of the vacuum valve 61. The movable-side shield 44 and the movable conductor 65 are electrically connected to each other via a contact 45. The immovable-side shield 43 is provided so as to cover the immovable-side end portion 62c of the vacuum valve 61 and connected to the end plate 63 on the immovable side. The movable-side shield 44 is provided so as to cover the movable-side end portion 62d and an end portion of the movable conductor 65 of the vacuum valve 61 and connected to the movable-side endplate 67 of the vacuum valve 61. By providing the immovable-side shield 43 and the movable-side shield 44 in shapes covering the immovable-side end portion 62c and the movable-side end portion 62d, respectively, it becomes possible to ease concentration of electric fields at the immovable-side end portion 62c and the movable-side end portion 62d of the vacuum valve 61.

The immovable-side shield 43 is attached to a support frame 41 via an insulating support member 42. As is shown in FIG. 2, with bolts 51, the support frame 41 is fixed to attachment mounts 21g firmly attached to the tank 21.

Figure 3:
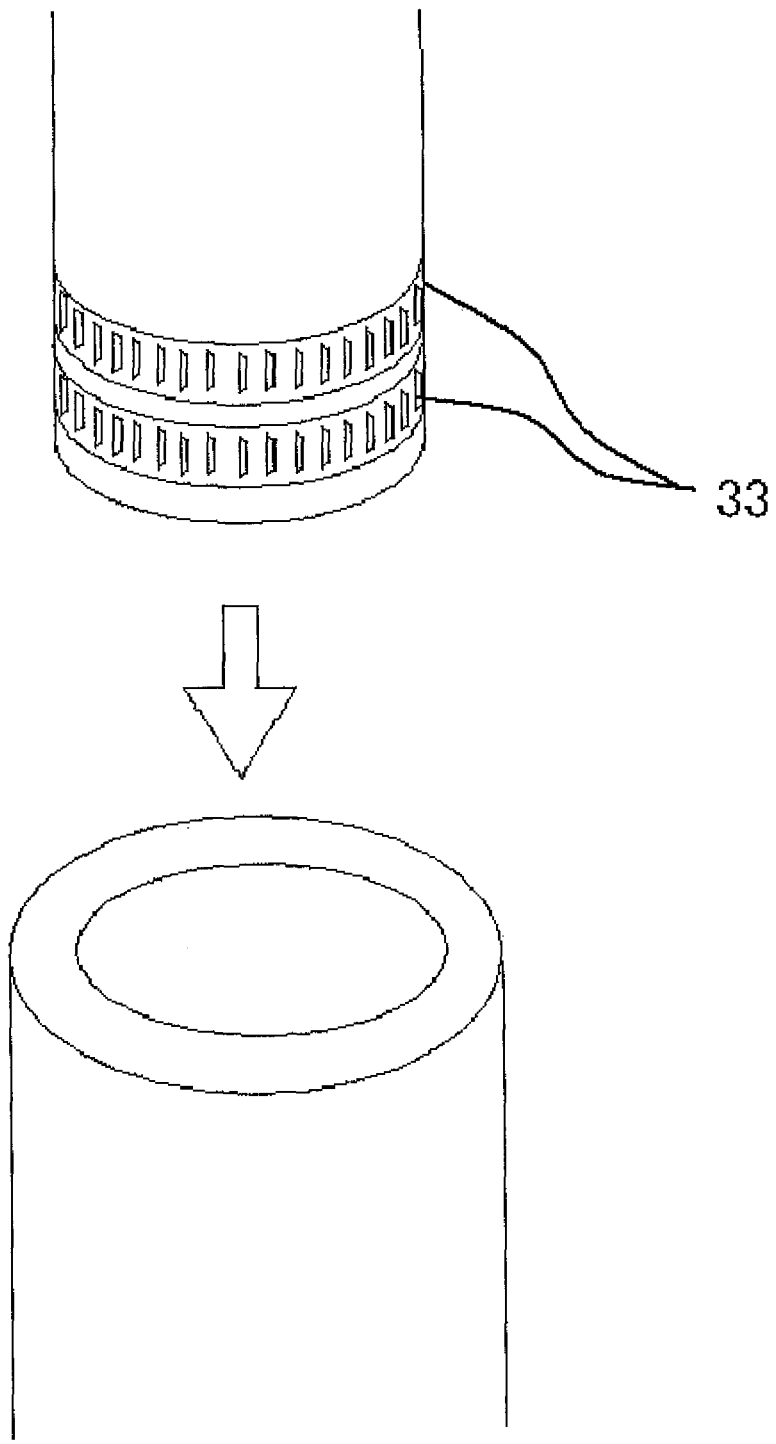
FIG. 3 is a perspective view used to describe a conductor connection portion according to the first embodiment of the invention.

Insertion portions 43a and 44a, into which lower ends of a lower conductor 32a and a lower conductor 32b are respectively inserted, are provided to upper parts of the immovable-side shield 43 and the movable-side shield 44, respectively. Upper ends of the lower conductor 32a and the lower conductor 32b are inserted in and connected to lower ends of an upper conductor 31a and an upper conductor 31b, respectively. In order to lessen electrical contact resistance, contacts 33 formed of many conductor blade spring pieces and having a contact pressure due to a spring force induced by self-transformation are interposed in each of contact portions (connection portions) between the upper conductor 31a and the lower conductor 32a, the upper conductor 31b and the lower conductor 32b, the lower conductor 32a and the insertion portion 43a, and the lower conductor 32b and the insertion portion 44a. Each contact portion is slidable in an axial direction of the conductors. FIG. 3 shows one embodiment of the contacts 33. Terminal plates (terminal conductors) 30a and 30b are firmly attached to the upper ends of the upper conductor 31a and the upper conductor 31b, respectively, by means of bolt fastening or welding. The terminal plates 30a and 30b are attached to upper end portions of the bushings 34a and 34b, respectively, and hermetically close the upper end portions of the respective bushings.

A replacing method of the vacuum valve 61 will now be described. The lid plates 22 and 23, respectively, of the opening portions 21d and 21f of the tank 21 are removed. Then, the insulating rod 46 is separated from the operation rod 48 by removing the pins 47 of the insulating rod 46. Subsequently, the lower conductors 32a and 32b are pulled upward so as to slide along the axial direction of the lower conductors 32a and 32b until they go out of contact with the insertion portions 43a and 44a, respectively, and retained by an assembly tool. In this manner, an integral structure from the insulating rod 46 to the support frame 41 including the vacuum valve 61 is separated from the operation rod 48 as well as from the lower conductor 32a and the lower conductor 32b. Accordingly, after the support frame 41 is retained by the assembly tool, fastening by the bolts 51 between the support frame 41 and the attachment mounts 21g of the tank 21 is unfastened. Then, the structure including the vacuum valve 61 is pulled out horizontally from the opening portion 21d and the vacuum valve is replaced. Re-assembly is carried out by steps inverse to the de-assembly steps described as above. More specifically, the integral structure from the insulating rod 46 to the support frame 41 including the vacuum valve 61 is inserted into the tank 21 and the support frame 41 and the attachment mounts 21g of the tank 21 are fixed to each other with the bolts 51. Then, the insulating rod 46 and the operation rod 48 are connected to each other with the pins 47, and the lower conductors 32a and 32b are inserted into the insertion portions 43a and 44a, respectively. Re-assembly is completed when the lid plates 22 and 23 are attached.

As has been described, when the vacuum valve 61 is replaced, the vacuum valve 61 can be pulled out and re-assembly can be completed by merely opening the lid plates 22 and 23 without having to remove the bushings 34a and 34b, the operation box 50 and the coupling mechanism of the drive unit 49 or the operation rod 48 attached to the movable side of the tank 21. It thus becomes possible to enhance workability of replacement of the vacuum valve 61.

In this embodiment, contacts formed of many conductor blade spring pieces are used as the contacts 33. However, as long as being slidable in the axial direction of the conductors, the same advantage can be achieved with a method of winding conductor coil springs around the conductors.

Second Embodiment

Figure 4:
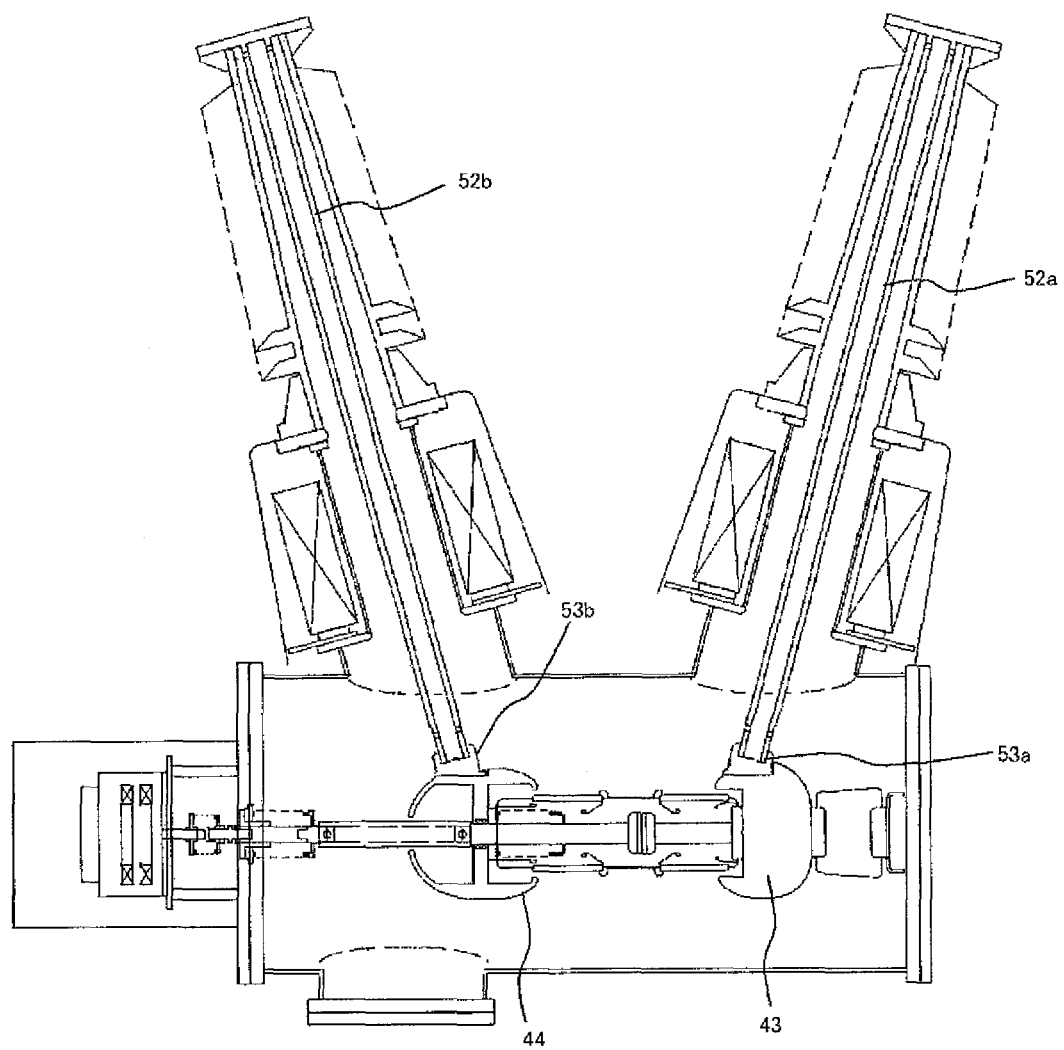
FIG. 4 is a cross section of a dead tank vacuum circuit breaker according to a second embodiment of the invention.
Figure 5:
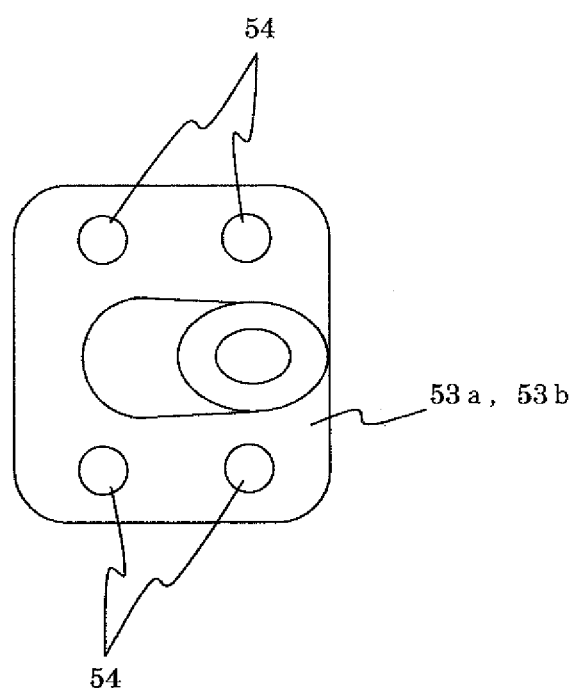
FIG. 5 is a perspective view used to describe a conductor insertion portion according to the second embodiment of the invention.

FIG. 4 is a view used to describe a dead tank vacuum circuit breaker according to a second embodiment for carrying out the invention. Hereinafter, one mode for carrying out the invention will be described according to the drawings. Adapters 53a and 53b, in which a conductor (lead conductor) 52a and a conductor (lead conductor) 52b are inserted respectively, are bolted to an immovable-side shield (connection conductor) 43 and a movable-side shield (connection conductor) 44, respectively. FIG. 5 shows the adapter 53a and 53b, and bolt insertion holes 54 are provided on the periphery of an insertion portion located at the center. Contacts 33 as are shown in FIG. 3 are provided to contact portions between the conductors 52*a* and 52*b* and the adapters 53*a* and 53*b*, respectively. The rest of the structure is the same as that of the first embodiment above.

A method of replacing the vacuum valve 61 will now be described. The lid plates 22 and 23, respectively, of the opening portions 21*d* and 21*f* of the tank 21 are removed. Then, the insulating rod 46 is separated from the operation rod 48 by removing the pins 47 of the insulating rod 46. Subsequently, the adapters 53*a* and 53*b* are separated from the immovable-side shield 43 and the movable-side shield 44, respectively, by removing all the bolts of the adapters 53*a* and 53*b*. In this manner, an integral structure from the insulating rod 46 to the support frame 41 including the vacuum valve 61 is separated from the operation rod 48 as well as from the conductor 52*a* and the conductor 52*b*. Accordingly, while the support frame 41 is retained by the assembly tool, fastening by the bolts 51 between the support frame 41 and the attachment mounts 21*g* of the tank 21 is unfastened. Then, the structure including the vacuum valve 61 is pulled out horizontally from the opening portion 21*d* and the vacuum valve 61 is replaced. Re-assembly is carried out by steps inverse to the de-assembly steps described as above. More specifically, the integral structure from the insulating rod 46 to the support frame 41 including the vacuum valve 61 is inserted into the tank 21 and the support frame 41 and the attachment mounts 21*g* of the tank 21 are fixed to each other with the bolts 51. Then, the insulating rod 46 and the operation rod 48 are connected to each other with the pins 47, and the adapters 53*a* and 53*b* inserted into the conductors 52*a* and 52*b*, respectively, are connected to the immovable-side shield 43 and the movable-side shield 44, respectively, with the bolts. Re-assembly is completed when the lid plates 22 and 23 are attached.

Third Embodiment

Figure 6:
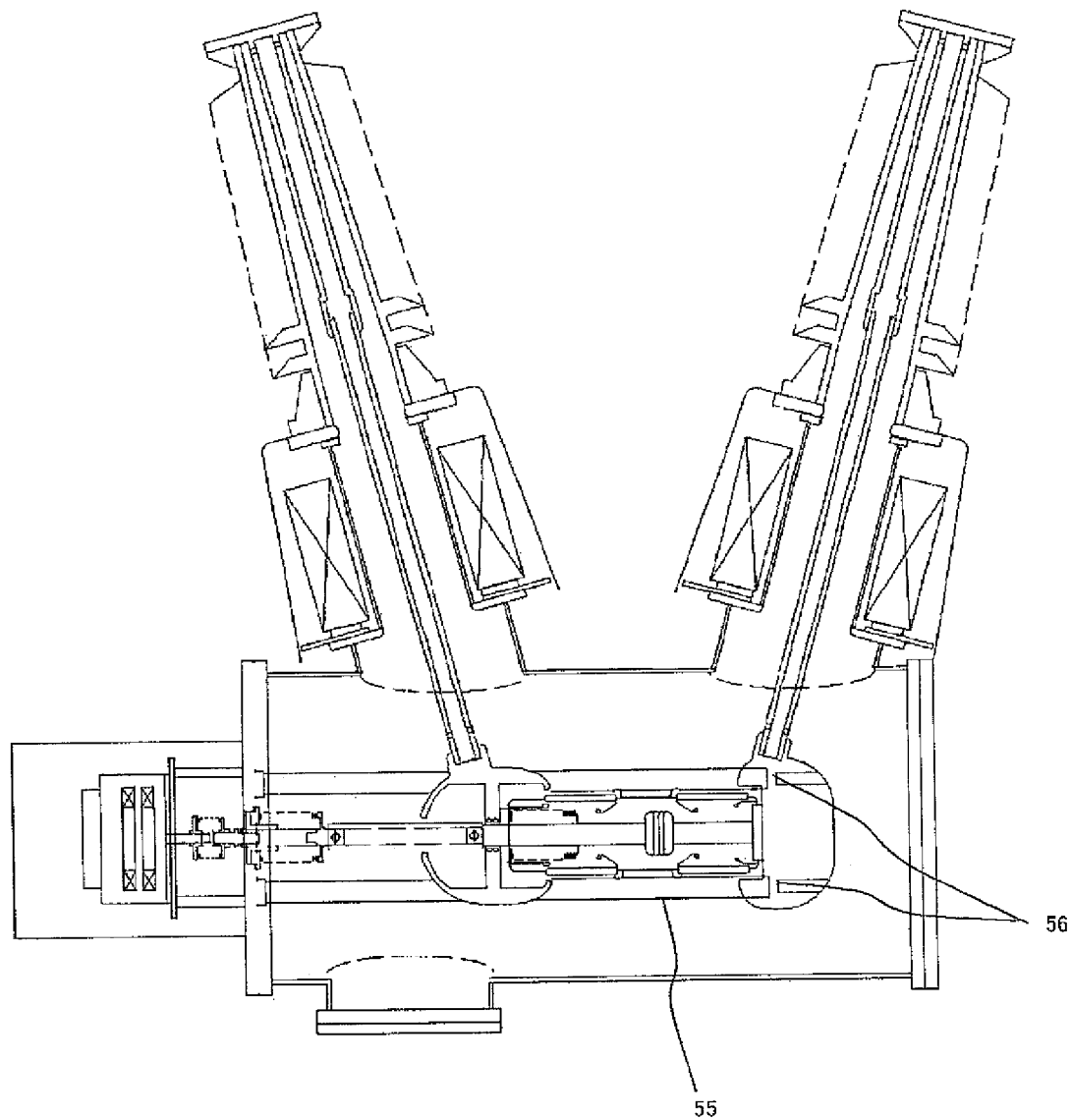
FIG. 6 is a cross section of a dead tank vacuum circuit breaker according to a third embodiment of the invention.

FIG. 6 is a view used to describe a dead tank vacuum circuit breaker according to a third embodiment for carrying out the invention. Hereinafter, one mode for carrying out the invention will be described according to the drawing. An immovable-side shield 43 and a movable-side shied 44 are attached to the both ends of a vacuum valve 61 via an end plate 63 and an end plate 67, respectively. The immovable-side shield 43, to which one ends of insulating support rods 55 are attached with bolts 56, holds the vacuum valve 61 at a predetermined position in the interior of a tank 21 by fixing the other ends of the insulating support rods 55 to a lid plate 24 of a movable-side opening portion 21*e* of the tank 21. The rest of the configuration is the same as that of the first embodiment above.

A method of replacing the vacuum valve 61 will now be described. The lid plates 22 and 23, respectively, of the opening portions 21*d* and 21*f* of the tank 21 are removed. Then, the insulating rod 46 is separated from the operation rod 48 by removing the pins 47 of the insulating rod 46. Subsequently, the lower conductors 32*a* and 32*b* are pulled upward along the axial direction of the lower conductors 32*a* and 32*b* until they go out of contact with the insertion portions 43*a* and 44*a*, respectively, and retained by an assembly tool. In this manner, an integral structure from the insulating rod 46 to the immovable-side shield 43 including the vacuum valve 61 is separated from the operation rod 48 as well as from the lower conductor 32*a* and the lower conductor 32*b*. Accordingly, the bolts 56 of the immovable-side shield 44 are removed and the structure including the vacuum valve 61 is pulled out horizontally from the opening portion 21*d* and the vacuum valve is replaced. Re-assembly is carried out by steps inverse to the de-assembly steps described as above. More specifically, the integral structure from the insulating rod 46 to the immovable-side shield 43 including the vacuum valve 61 is inserted into the tank 21 and the immovable-side shield 44 and the insulating supporting rod 55 are fixed to each other with the bolts 56. Then, the insulating rod 46 and the operation rod 48 are connected to each other with the pins 47, and the lower conductors 32*a* and 32*b* are inserted into the insertion portions 43*a* and 44*a*, respectively. Re-assembly is completed when the lid plates 22 and 23 are attached.

Still another embodiment will be described in the following.

A dead tank vacuum circuit breaker includes:

an electrically grounded pressure tank having a plurality of opening portions, in which an insulating gas is sealed;

bushings connected to the pressure tank at one ends and hermetically sealed at the other ends by terminal conductors;

a vacuum valve provided to the pressure tank and housing an immovable conductor and a movable conductor allowed to come close to and move apart from the immovable conductor;

lead conductors provided concentrically in the bushings and connected to the terminal conductors;

connection conductors connecting the lead conductors and the respective immovable conductor and movable conductor; and opening and closing means for driving the movable conductor via an insulating rod connected to the movable conductor.

The dead tank vacuum circuit breaker is characterized by having:

fastening means configured in such a manner that a connection portion of an insulating support member fixed to the pressure tank and an immovable-side end of the vacuum valve is attachable and detachable in a vicinity of the immovable-side opening portion of the pressure tank; and fastening means having adapters connecting the lead conductors and the connection conductors, the adapters being attachable to and detachable from the connection conductors.

DESCRIPTION OF REFERENCE NUMERALS AND SIGNS

21: tank
21*a*: opening portion
21*b*: opening portion
21*c*: barrel portion
21*d*: opening portion
21*e*: opening portion
21*f*: opening portion
21*g*: attachment mount
22: lid plate
23: lid plate
24: lid plate
25: bellows
31*a*: upper conductor
31*b*: upper conductor
32*a*: lower conductor
32*b*: lower conductor
33: contact
34*a*: bushing
34*b*: bushing
35*a*: current transformer
35*b*: current transformer
36*a*: current transformer cover
36*b*: current transformer cover
43: immovable-side shield
43*a*: insertion portion 44: movable-side shield
44a: insertion portion
45: contact
46: insulating rod
47: pin
48: operation rod
49: drive unit
50: operation box
51: bolt
52a: conductor
52b: conductor
53a: adapter
53b: adapter
54: bolt insertion hole
55: insulating support rod
56: bolt
61: vacuum valve
62: vacuum container
62a: insulating tube
62b: insulating tube
62c: immovable-side end portion
62d: movable-side end portion
63: end plate
64: immovable conductor
65: movable conductor
66: bellows
67: end plate

The invention claimed is:
1. A dead tank vacuum circuit breaker, comprising:
an electrically grounded pressure tank having a plurality of opening portions, in which an insulating gas is sealed;
bushings connected to the pressure tank at one ends and hermetically sealed at the other ends by terminal conductors;
a vacuum valve provided to the pressure tank and housing an immovable conductor and a movable conductor allowed to come close to and move apart from the immovable conductor;
lead conductors provided concentrically in an inner space of the bushings and connected to the terminal conductors;
connection conductors connecting the lead conductors and the respective immovable conductor and movable conductor; and
opening and closing means for driving the movable conductor via an insulating rod connected to the movable conductor,
the dead tank vacuum circuit breaker being characterized in that:
an insulating support member supporting an immovable-side end of the vacuum valve is attached to the pressure tank in a vicinity of the immovable-side opening portion of the pressure tank in an attachable and detachable manner; and
the lead conductors and the connection conductors are slidable in an axial direction of the lead conductors in the inner space of the bushings during a state when the bushings are connected to the pressure tank, and a connection portion slidable in the axial direction is provided to at least one point in the respective lead conductors.

2. A dead tank vacuum circuit breaker, comprising:
an electrically grounded pressure tank having a plurality of opening portions, in which an insulating gas is sealed;
bushings connected to the pressure tank at one ends and hermetically sealed at the other ends by terminal conductors;
a vacuum valve provided to the pressure tank and housing an immovable conductor and a movable conductor allowed to come close to and move apart from the immovable conductor;
lead conductors provided concentrically in the bushings and connected to the terminal conductors;
connection conductors connecting the lead conductors in an inner space of the pressure tank and the respective immovable conductor and movable conductor; and
opening and closing means for driving the movable conductor via an insulating rod connected to the movable conductor,
the dead tank vacuum circuit breaker being characterized in that:
an insulating support member supporting an immovable-side end of the vacuum valve is attached to the pressure tank in a vicinity of the immovable-side opening portion of the pressure tank in an attachable and detachable manner; and
the dead tank vacuum circuit breaker has fastening means having adapters connecting the lead conductors and the connection conductors, the adapters being in the inner space of the pressure tank and attachable to and detachable from the connection conductors during a state when the bushings are connected to the pressure tank.

3. A dead tank vacuum circuit breaker, comprising:
an electrically grounded pressure tank having a plurality of opening portions, in which an insulating gas is sealed;
bushings connected to the pressure tank at one ends and hermetically sealed at the other ends by terminal conductors;
a vacuum valve provided to the pressure tank and housing an immovable conductor and a movable conductor allowed to come close to and move apart from the immovable conductor;
lead conductors provided concentrically in an inner space of the bushings and connected to the terminal conductors;
connection conductors connecting the lead conductors and the respective immovable conductor and movable conductor; and
opening and closing means for driving the movable conductor via an insulating rod connected to the movable conductor,
the dead tank vacuum circuit breaker being characterized in that:
the dead tank vacuum circuit breaker has fastening means configured in such a manner that a connection portion of an insulating support member fixed to the pressure tank and an immovable-side end of the vacuum valve is attachable and detachable in a vicinity of the immovable-side opening portion of the pressure tank; and
the lead conductors and the connection conductors are slidable in an axial direction of the lead conductors in the inner space of the bushings during a state when the bushings are connected to the pressure tank, and a connection portion slidable in the axial direction is provided to at least one point in the respective lead conductors.

4. A dead tank vacuum circuit breaker, comprising:
an electrically grounded pressure tank having a plurality of opening portions, in which an insulating gas is sealed;
bushings connected to the pressure tank at one ends and hermetically sealed at the other ends by terminal conductors;

a vacuum valve provided to the pressure tank and housing an immovable conductor and a movable conductor allowed to come close to and move apart from the immovable conductor;

lead conductors provided concentrically in the bushings and connected to the terminal conductors;

connection conductors connecting the lead conductors in an inner space of the pressure tank and the respective immovable conductor and movable conductor; and opening and closing means for driving the movable conductor via an insulating rod connected to the movable conductor, the dead tank vacuum circuit breaker being characterized by having:

fastening means configured in such a manner that a connection portion of an insulating support member fixed to the pressure tank and an immovable-side end of the vacuum valve is attachable and detachable in a vicinity of the immovable-side opening portion of the pressure tank; and fastening means having adapters connecting the lead conductors and the connection conductors, the adapters being in the inner space of the pressure tank and attachable to and detachable from the connection conductors during a state when the bushings are connected to the pressure tank.

5. The dead tank vacuum circuit breaker according to claim 1, wherein:

an opening portion is provided the pressure tank on a movable side at a position at which the insulating rod is present.

6. The dead tank vacuum circuit breaker according to claim 2, wherein:

an opening portion is provided the pressure tank on a movable side at a position at which the insulating rod is present.

7. The dead tank vacuum circuit breaker according to claim 3, wherein:

an opening portion is provided the pressure tank on a movable side at a position at which the insulating rod is present.

8. The dead tank vacuum circuit breaker according to claim 4, wherein:

an opening portion is provided the pressure tank on a movable side at a position at which the insulating rod is present.

9. The dead tank vacuum circuit breaker according to claim 1, wherein the connection portion is slidable in the axial direction of the lead conductors during the state when the bushings are connected to the pressure tank.

10. The dead tank vacuum circuit breaker according to claim 2, wherein the lead conductors and the connection conductors are slidable in the axial direction of the lead conductors during the state when the bushings are connected to the pressure tank.

11. The dead tank vacuum circuit breaker according to claim 2, wherein the connection portion is slidable in the axial direction of the lead conductors during the state when the bushings are connected to the pressure tank.

12. The dead tank vacuum circuit breaker according to claim 3, wherein the connection portion is slidable in the axial direction of the lead conductors during the state when the bushings are connected to the pressure tank.

* * * * *